(12) United States Patent
Lee

(10) Patent No.: US 8,042,668 B2
(45) Date of Patent: Oct. 25, 2011

(54) THREE-MODE OVERRUNNING BI-DIRECTIONAL CLUTCH

(75) Inventor: Brian Lee, York, SC (US)

(73) Assignee: Schaeffler KG, Herzogenaurach (DE)

( * ) Notice: Subject to any disclaimer, the term of this patent is extended or adjusted under 35 U.S.C. 154(b) by 1034 days.

(21) Appl. No.: 11/923,949

(22) Filed: Oct. 25, 2007

(65) Prior Publication Data

US 2008/0099294 A1    May 1, 2008

Related U.S. Application Data

(60) Provisional application No. 60/854,528, filed on Oct. 26, 2006, provisional application No. 60/876,651, filed on Dec. 22, 2006.

(51) Int. Cl.
*F16D 41/064* (2006.01)
(52) U.S. Cl. ............ 192/38; 192/78; 192/85.47
(58) Field of Classification Search .......... 192/37, 192/38, 78
See application file for complete search history.

(56) References Cited

U.S. PATENT DOCUMENTS

| 6,557,680 B2 * | 5/2003 | Williams | 192/27 |
| 7,415,905 B2 * | 8/2008 | Maguire et al. | 74/339 |
| 2008/0128233 A1 * | 6/2008 | Joki et al. | 192/45.1 |

* cited by examiner

*Primary Examiner* — David D Le
*Assistant Examiner* — Ryan Dodd
(74) *Attorney, Agent, or Firm* — Lucas & Mercanti, LLP

(57) ABSTRACT

The three mode overrunning bi-directional clutch has a first mode where the slipper race and fixed race are coupled and power is not transmitted between the inner input shaft and the outer shaft. A second mode where the slipper race is uncoupled from the fixed race and the slipper race engages the outer shaft to provide power transmission between the inner shaft and the outer shaft. The third mode couples the slipper race to the fixed race but uses a brake to provide radial force against the slipper race to allow for partial engagement between the slipper race and the outer shaft. This third mode allows for a smooth transition between the first mode and the second mode.

6 Claims, 10 Drawing Sheets

C - C

THREE-MODE OVERRUNNING BI-DIRECTIONAL CLUTCH

FIELD OF THE INVENTION

This invention relates to overrunning bi-directional clutches and more particularly to controlling the engagement between the freewheeling mode and the block mode of the clutch.

BACKGROUND OF THE INVENTION

Overrunning bi-directional clutches are known, see for example U.S. Pat. Nos. 6,409,001; 7,004,875; and 7,037,200. Such clutches are mounted between two coaxial shafts and are used to transfer power between the two shafts. The clutch is fixed to a first shaft and selectively engages with the second shaft so as to transfer power between the two shafts. Typically, the first shaft is the power input shaft and typically, the first shaft is also the inner shaft of the two shafts. The output shaft or second shaft can be a geared wheel.

Overrunning bi-directional clutches comprise a fixed race, a slipper race, cylindrical rollers which are housed between the two races and an actuator. The fixed race and the slipper race are coaxial cylindrical rings with opposing faces. Each of the opposing faces has concave bearing surfaces which define pockets. Each pocket houses a roller.

The slipper race has an axial groove or slit that extends both radially and axially through the race. The slit allows the slipper race to move radially under force and the memory inherent in the material from which the slipper race is made allows the race to return to a rest position once the force is withdrawn. The fixed race is mounted onto the first shaft while the slipper race is spaced in close proximity to the second shafts such that when the slipper race moves radially, it the second race, thereby transferring power between the two shafts. Once the force is removed from the slipper race, it returns to its rest position and no longer engages the second shaft. The rest position is generally referred to as the "freewheeling mode" or the first mode of operation of a clutch, while the engaged position when the slipper race engages the second shaft is referred to as the "blocked mode" or second mode of operation for the clutch.

The actuator is used to maintain the clutch in the freewheeling mode and to move the clutch to the blocked mode. Typically, the actuator is a radial mounted moveable pin which is fixed to the fixed race and retractable from the slipper race. When the actuator engages both races the two races are coupled and the clutch is in the freewheeling mode. In the freewheeling mode, the opposing concave bearing surfaces are aligned with each other and the rollers rest in the bottom of each of the opposing concave surfaces. When the actuator pin is withdrawn from the slipper race, the two races move relative to one another and the rollers move out of the bottom of the opposing concave surfaces and rise up along diagonally opposing surfaces of the pocket so as to force the slipper race to move radially and to engage the second shaft.

One of the problems with overrunning bi-directional clutches is that once the actuator is moved to transfer the clutch from the freewheeling mode to the blocked mode, the clutch reacts very quickly and the overall time period is on the order of 10 to 25 milliseconds. For shafts traveling at high speeds, this shift can cause large noises, clunking and heat because the second shaft is essentially at rest and must be brought up to the speed of the first shaft instantaneously.

OBJECT OF THE INVENTION

It is the object of this invention to control the engagement of the slipper race to the second shaft by increasing the time period between the freewheeling mode and the blocked mode. By increasing the time between these two modes, the large noise, clanking and heat generation which are associated with the fast transition between the two modes can be diminished.

These and other objects of the invention will become more readily apparent by reference to the following description of the invention.

SUMMARY OF THE INVENTION

The objects of the invention are achieved by using a third mode wherein the slipper race slowly engages the second shaft. This slow engagement means that the two shafts are slowly brought up to equal speed and thereby synchronizing the two shafts in a controlled manner. Suitably, the time period for this third mode is on the order of about 200 to about 500 milliseconds. Providing the smooth transition between the freewheeling mode and the blocked mode of the clutch allows the clutch to be used in a vehicle transmission.

The third mode, also referred to as the braking mode, slowly engages the two shafts to synchronize the speed of the two shafts before the second mode is started. Once the speed of the two shafts is nearly equal, the actuator is used to uncouple the two shafts and to start the second mode.

In order to accomplish the third mode of operation, the clutch has a brake (engagement member) which applies a radial force against the slipper race to move the slipper race into slow frictional engagement with the second shaft. The brake can be a conical hub which is coaxially mounted on the first shaft and is axially adjacent to the fixed and slipper race. The hub has a slanted engaging surface which is axially adjacent the slipper race. The hub is axially moved such that the slanted engaging surface engages the slipper race and applies a radial force to the slipper race to cause the slipper race to start to engage the second shaft. In an alternative embodiment, the brake is a plurality of hydraulic pistons which are fixed to the fixed race and can apply radial pressure against selected roller, thereby applying radial force against the slipper race to cause the slipper race to slowly engage the second shaft.

Preferably, the slipper race is an outer race and the fixed race is an inner race of the clutch.

Broadly, the present invention can be defined as follows:
a three mode overrunning bi-directional clutch for mounting between a first and a second coaxial shafts and transferring power between the shafts, said clutch comprising:
a cylindrical slipper race having a first radial surface for frictionally engaging a second shaft and a second radial surface having a plurality of concave bearing surfaces thereon;
a cylindrical fixed race having a first radial surface fixed to a first shaft and a second radial surface having a plurality of concave bearing surfaces thereon, said slipper race coaxial with and radially opposing said fixed race such that each of the fixed race concave bearing surfaces radially opposes one of said slipper race concave bearing surfaces so as to form pocket therebetween;
cylindrical rollers positioned in each of said pockets;
an actuator affixed to said fixed race and engageable with said slipper race, said actuator engageable with said slipper race to couple said slipper race to said fixed race, and said actuator disengageable from said slipper race to uncouple said slipper race from said fixed race and cause said rollers to roll against the concave bearing surfaces in said pockets and apply a radial force against the slipper race to cause the slipper race to engage said second shaft;

a brake engageable with said slipper race for applying a radial force against said slipper race to cause the frictional surface to the slipper race to engage the second shaft; and said clutch having three modes of operation the first mode where said actuator couples said slipper race to said fixed race, the second mode where said actuator uncouples (does not couple) said slipper race from said fixed race, and a third mode where said actuator couples said slipper race to said fixed race and said brake applies radial force to said slipper race so that said slipper race engages said second shaft.

Suitably, the actuator is a moveable pin and the second shaft is a geared wheel.

Preferably, the first shaft is an inner shaft, the second shaft is an outer shaft and the slipper race is the outer cylindrical race while the fixed race is the inner cylindrical race.

These and other aspects of the present invention will become more apparent by reference to one or more of the following drawings.

DETAILED DESCRIPTION OF THE DRAWINGS

Figure 1:
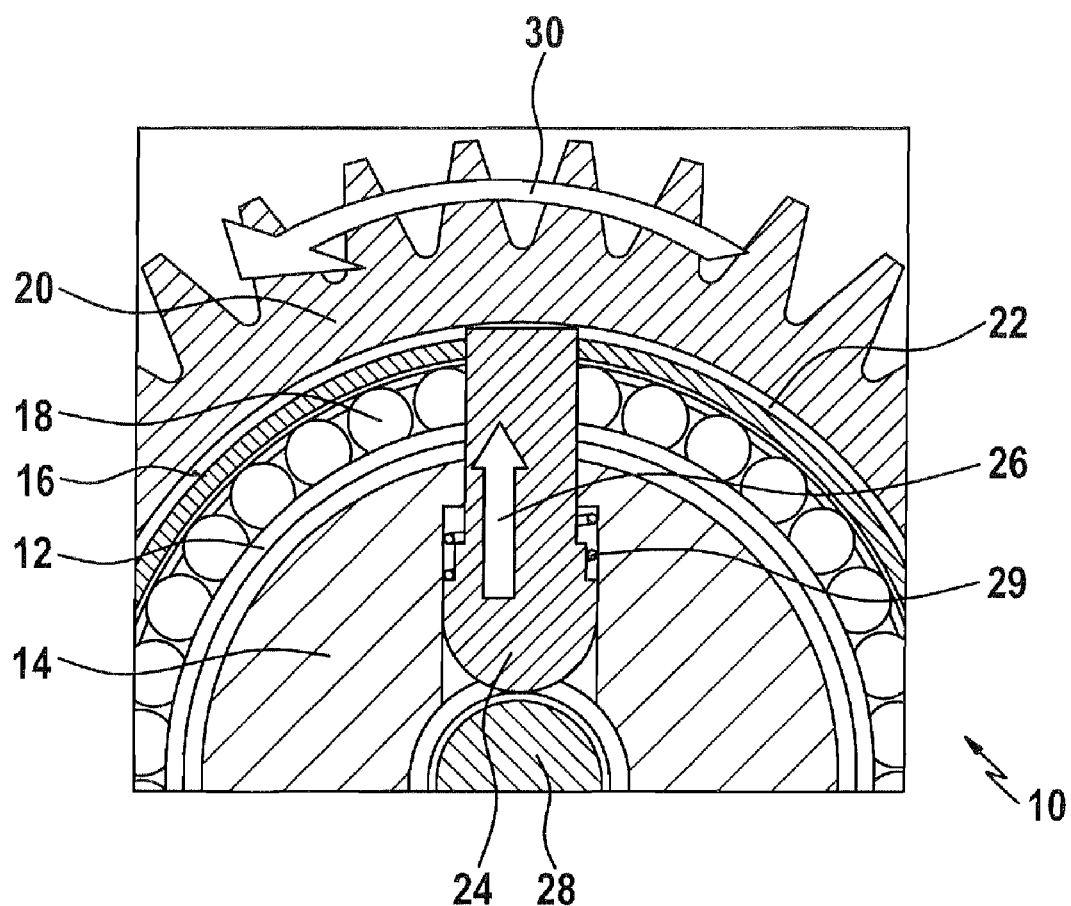
FIG. 1 illustrates a cross-sectional view of a clutch in the coupled mode, first mode.

FIG. 1 illustrates a partial view of overrunning bi-directional clutch 10 in the freewheeling mode, also referred to as the first mode. Clutch 10 as shown in FIG. 1 comprises a fixed race 12 fixed to an inner shaft 14, inner shaft 14 is the input shaft or power shaft for clutch 10. Slipper race 16 forms an outer race that radially opposes fixed race 12. Positioned between fixed race 12 and slipper race 16 is rollers 18. As illustrated, slipper race 16 is in close proximity to outer shaft 20. As illustrated in FIG. 1, outer shaft 20 is a geared wheel. Clearance 22 illustrates the space between outer shaft 20 and slipper race 16. Actuator pin 24, which is illustrated as a moveable pin, is forced upward as shown by arrow 26 by actuator cam 28. Actuator pin 24 engages both fixed race 12 and slipper race 16 to couple races 12 and 16 such that races 12 and 16 move in unison in conjunction with shaft 14. Actuator cam 28 counters the forces of spring 29. Shaft 14 rotates in the direction of arrow 30 and clutch 10 does not transfer power from shaft 14 to shaft 20 in the embodiment illustrated in FIG. 1.

Figure 2:
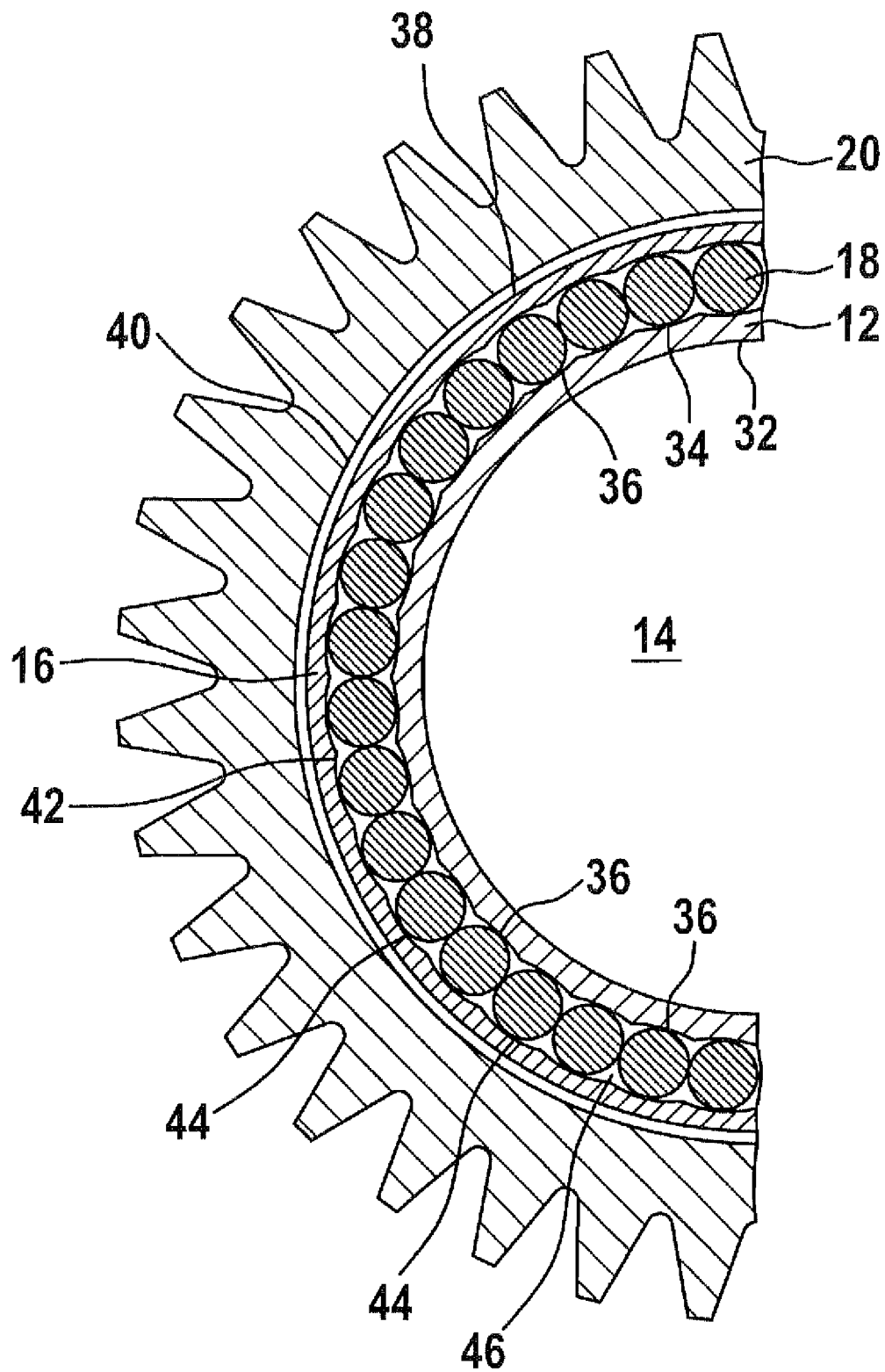
FIG. 2 illustrates the detailed relationship between the races and the shafts in the coupled mode, first mode.

FIG. 2 illustrates in more detail the elements of slipper race 16 and fixed race 12 in the freewheeling mode. Specifically, fixed race 12 has a first radial surface 32 which is fixed against inner shaft 14. Fixed race 12 also has second radial surface 34 with a plurality of concave 36 bearing surfaces thereon. As can be seen in FIG. 2, each roller 18 is sitting in the bottom of its respective concave bearing surface 36. Slipper race has first radial surface 38 intended for frictional engagement with inner surface 40 of outer shaft 20. Second radial surface 42 of slipper race 16 has a plurality of concave bearing surfaces 44. As can be seen in FIG. 2, rollers 18 sit in the bottom of concave bearing surfaces 44 when the clutch is in the first mode or freewheeling mode. It can also be seen that concave bearing surfaces 36 opposed concave bearing surfaces 44 so as to form pockets 46 between the opposing bearing surfaces 36 and 44 and each of the pockets 46 house a roller 18.

Figure 3:
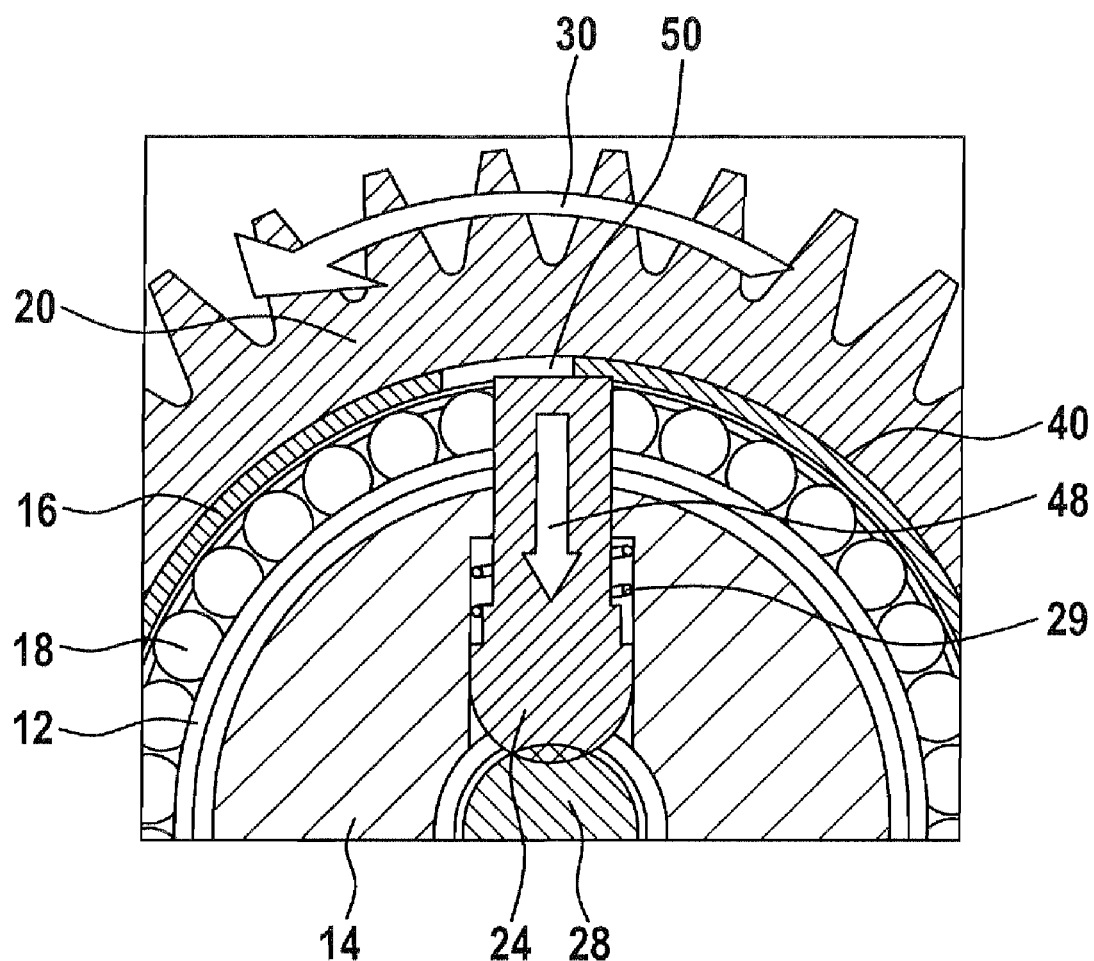
FIG. 3 illustrates the clutch of FIG. 1 in the uncoupled, second mode.

FIG. 3 illustrates the second mode or block mode wherein actuator cam 28 has been withdrawn such that spring 29 forces actuator pin 24 downward as shown by arrow 48. Actuator pin 24 is moveable in a radially downward direction due to the force of spring 29, as illustrated in FIG. 3. This downward movement of pin 24 causes pin 24 to leave slot 50 and for the uncoupling of races 12 and 16.

Since inner shaft 14 is traveling in the direction of arrow 30, the uncoupling of race 12 from 14 causes slipper race 16 to lag behind fixed race 12 and for rollers 18 to move along bearing surfaces 36 and 44, thereby applying an outward radial force against slipper race 16. This outward radial force causes the expansion or radial movement of slipper race 16 and the frictional engagement of first radial surface 38 with inner surface 40 of outer shaft 20. This engagement is shown in FIG. 4.

Figure 4:
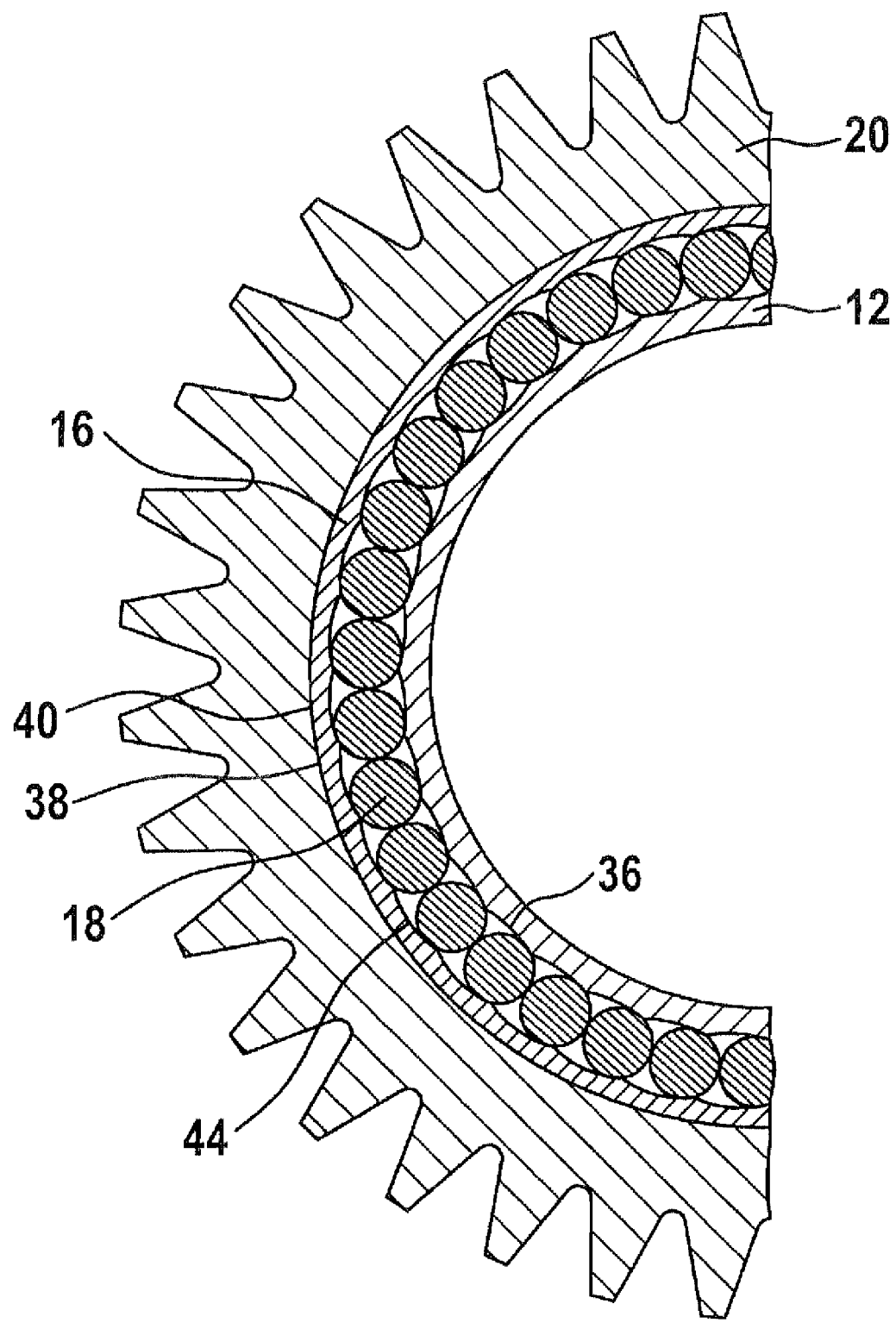
FIG. 4 illustrates the relationship between the shafts and the races in the uncoupled, second mode.

As illustrated in FIG. 4, rollers 18 have come to rest on diagonally opposing surfaces of concave bearing surfaces 36 and 44. As can be seen in FIG. 4, slipper race fully engages outer shaft 20 and power is transferred between inner shaft 14 and outer shaft 20.

Figure 5:
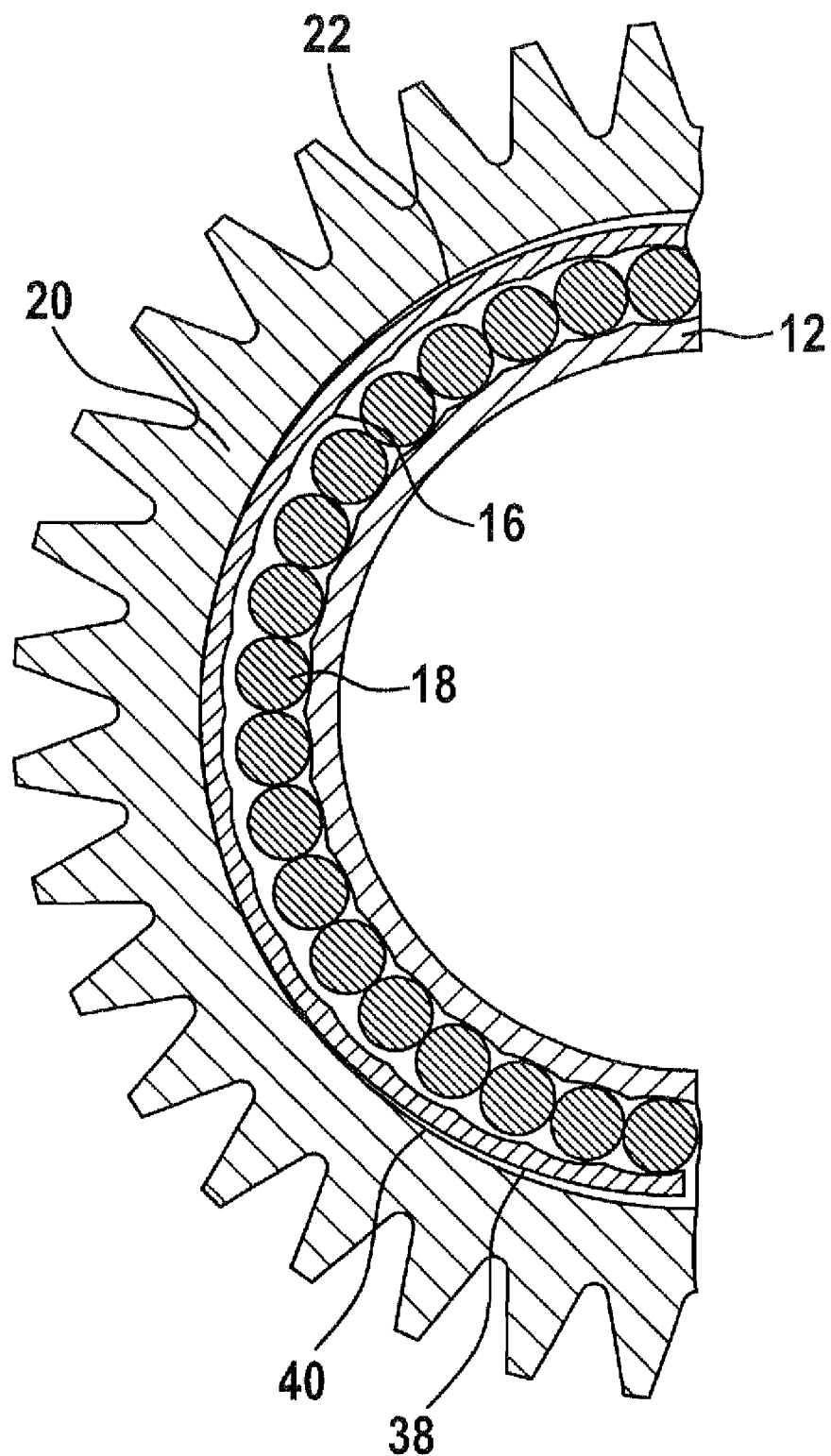
FIG. 5 illustrates the relationship between the shafts and the races in the brake mode, third mode of the clutch.

FIG. 5 illustrates the third mode, or braking mode in accordance with the present invention. In this mode, an outward radial force is applied against slipper race 16 while actuator pin 24 remains in slot 50. By maintaining the coupling of races 12 and 16, rollers 18 remain in their respective pockets 46 and therefore do not apply a radial force against slipper race 16. The radial force applied against slipper race 16 as illustrated in FIG. 5, is variable such that first radial surface 38 partially frictionally engages inner surface 40 as illustrated in FIG. 5. This partial engagement provides a slow start of acceleration for outer shaft 20. The slow acceleration is accounted for by the partial engagement between slipper race 16 and outer shaft 20. As can be seen in FIG. 5, clearance 22 is present along portions between first radial surface 38 and inner surface 40.

It will be understood that by varying the radial force applied during brake mode to slipper race 16, the surface area contact between surfaces 38 and 40 can be varied and therefore vary the rate at which outer shaft 20 is brought up to the speed of inner shaft 14. Such varying of rate provides for the controlled engagement between shafts 14 and 20 and the synchronization of their speeds.

Figure 6:
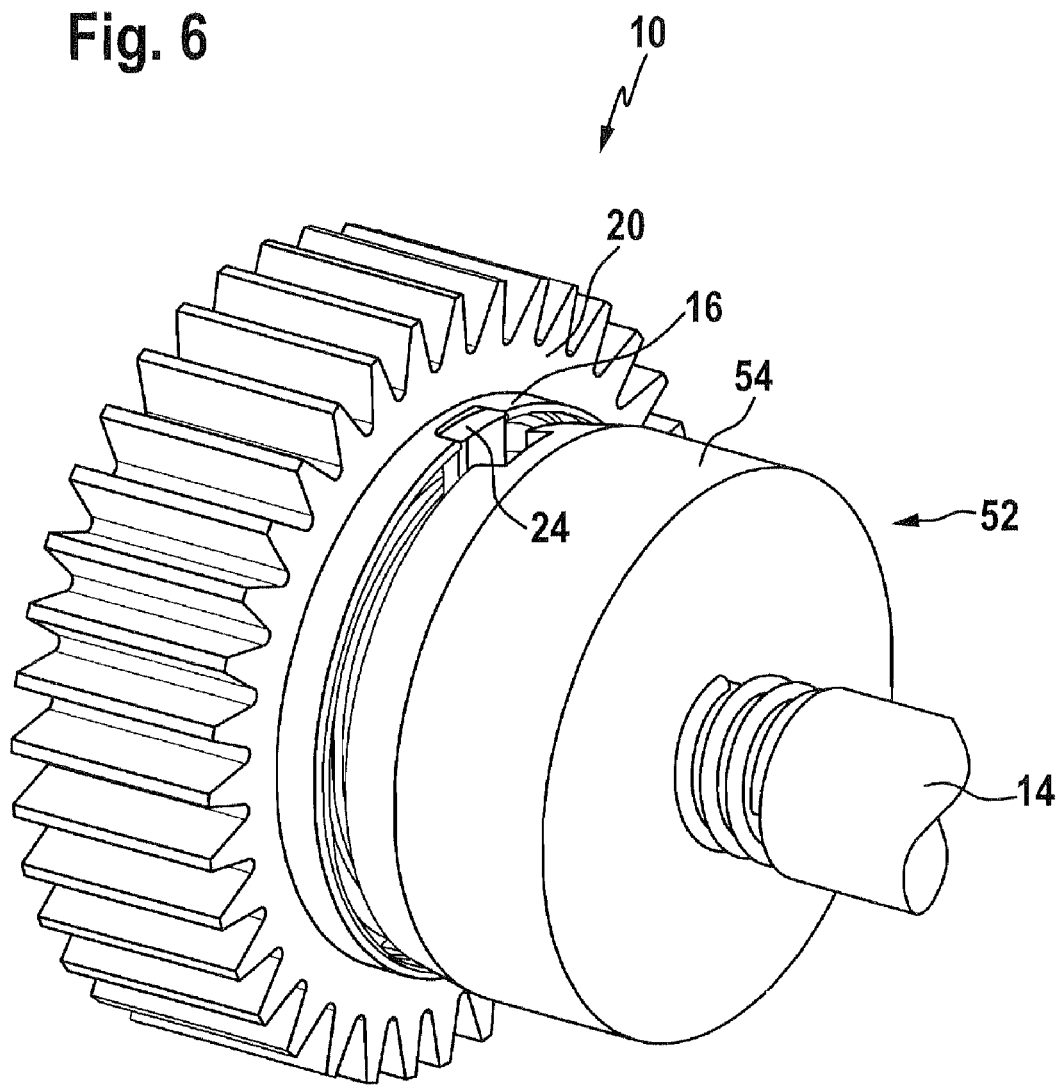
FIG. 6 is a perspective view of the conical hub brake of the present invention.

FIG. 6 illustrates brake 52 with conical hub 54. Conical hub 54 is coaxially mounted on inner shaft 14 and is axially movable into engagement with slipper race 16.

Figure 7:
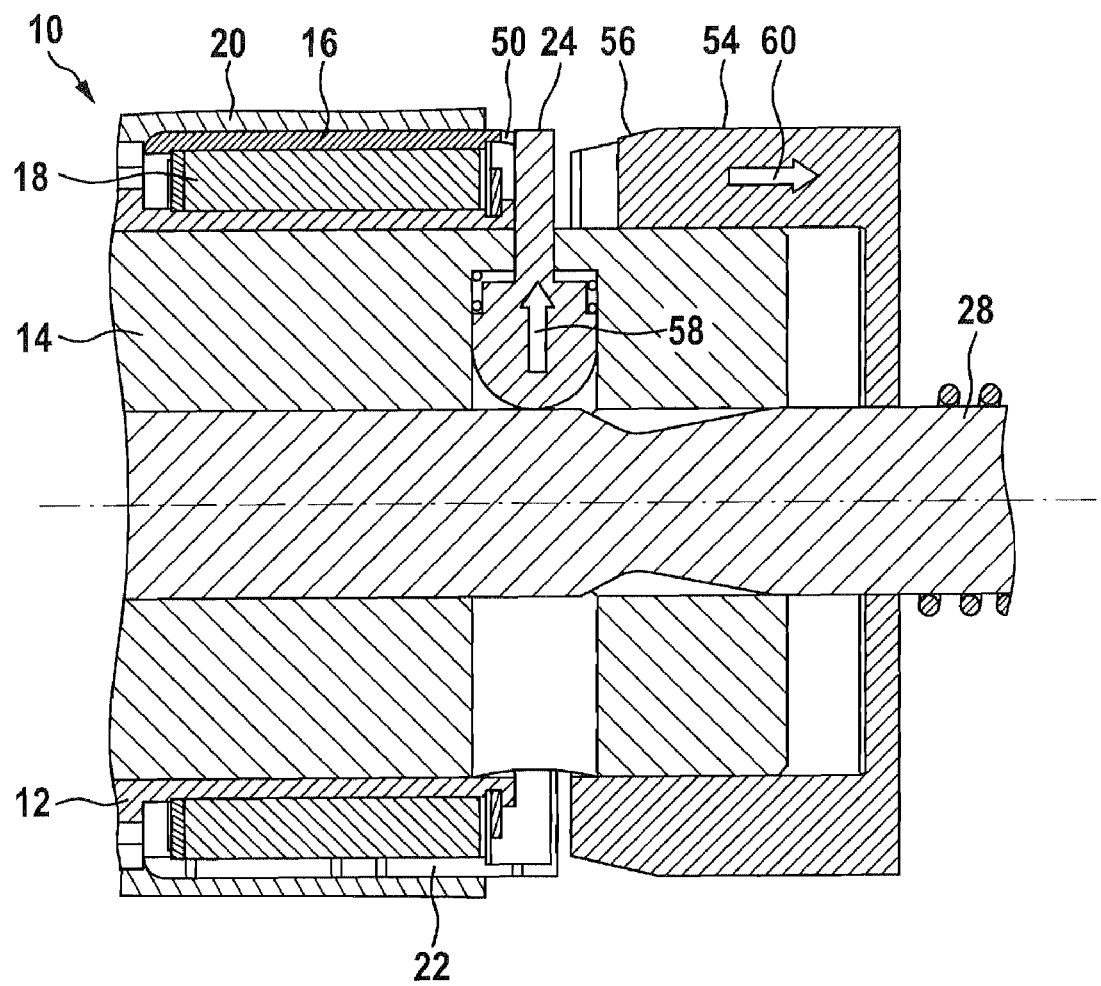
FIG. 7 is a cross-section of the hub of FIG. 6.

FIG. 7 is an axial cross-section of clutch 10. FIG. 7 illustrates the cylindrical dimensions of races 12 and 16 and rollers 18. Hub 54 has slanted surface 56 along portions of hub 54 which axially opposes races 12 and 16. Clearance 22 is shown in the bottom half of FIG. 7 and illustrates clutch 10 in the first mode position where actuator pin 24 is in slot 50 and conical hub 54 is withdrawn from engagement with slipper race 16 as shown by arrows 58 and 60.

Figure 8:
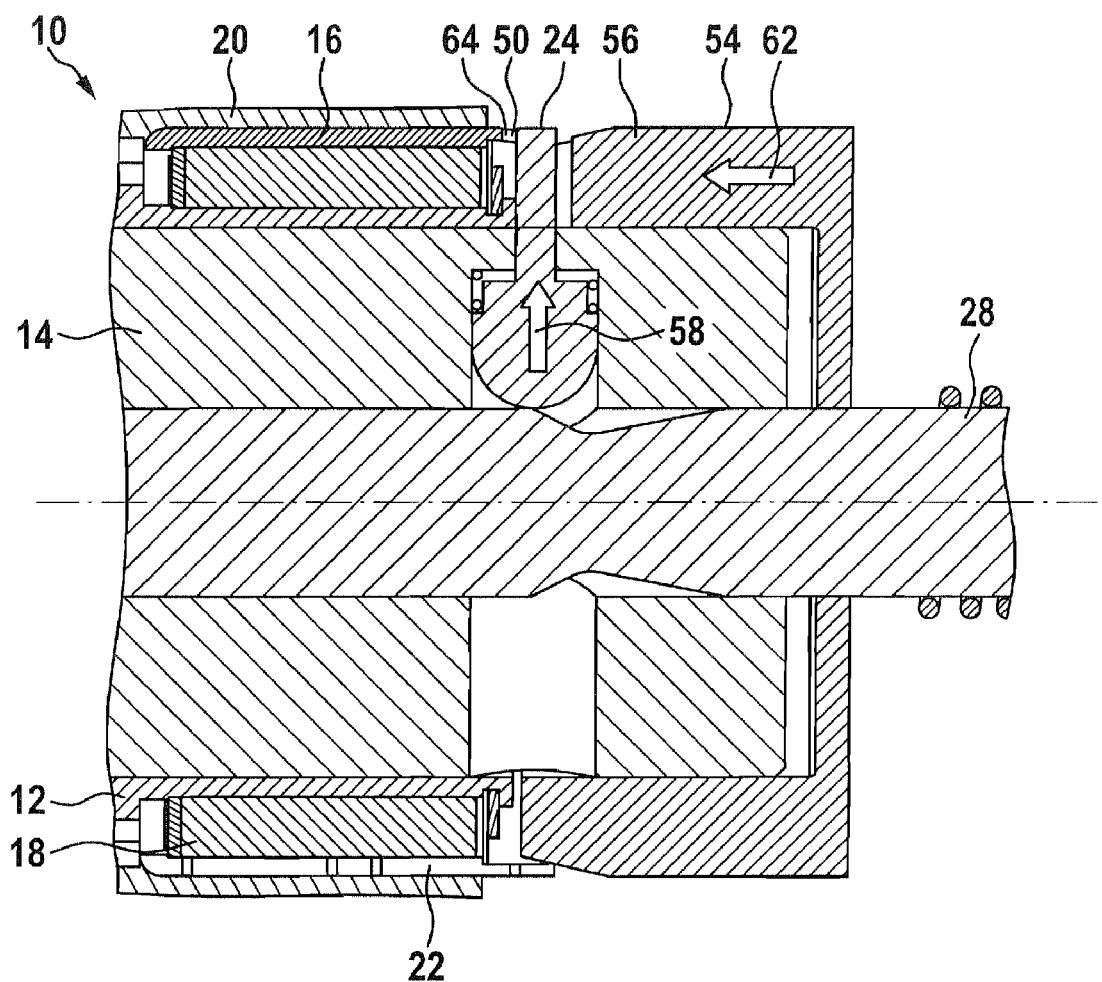
FIG. 8 is a cross-section of the hub of FIG. 6 in the brake mode, third mode for the clutch.

In FIG. 8, actuator cam 28 is moved axially to cause hub 54 to move in the direction of arrow 62 and force slanted surface 56 to ride under ledge 64 of slipper race 16. The force exerted by slanted surface 56 against ledge 64 causes slipper race 16 to be radially forced outward and into contact with outer shaft 20 at those points where hub 54 has slanted surface 56. Actuator pin 24 is still forced upward as shown by arrow 58 such that pin 24 is still engaged with slot 50. The radial force provided by hub 54 against slipper race 16 results in a configuration as shown in FIG. 5 where there is partial engagement between surfaces 38, 40.

The rate at which hub 54 moves in the direction of arrow 62 controls the speed at which slipper race 16 engages outer shaft 20.

Figure 9:
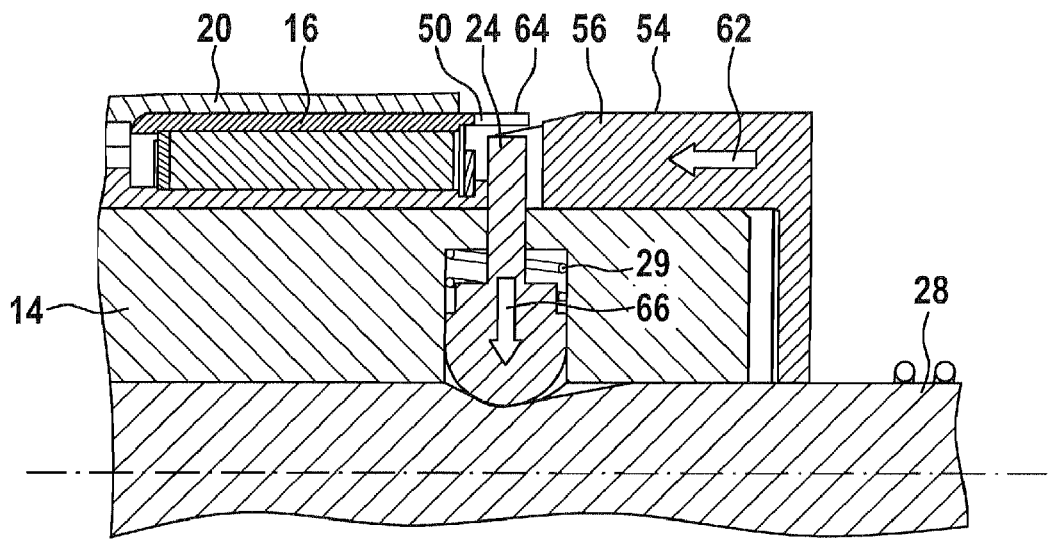
FIG. 9 illustrates the transition between the brake mode and the second mode, locked mode of the clutch.

FIG. 9 illustrates clutch 10 transitioning from brake mode to lock mode. Actuator cam 28 has moved further axially causing spring 29 to force actuator pin 24 downward as shown by arrow 66 and out of slot 50. This allows rollers 18 to ride up concave bearing surfaces 36 and 44 as shown in FIG. 4 and therefore apply a radial force along the complete slipper race 16, thereby transferring the clutch from the brake mode to the blocked mode.

Figure 10:
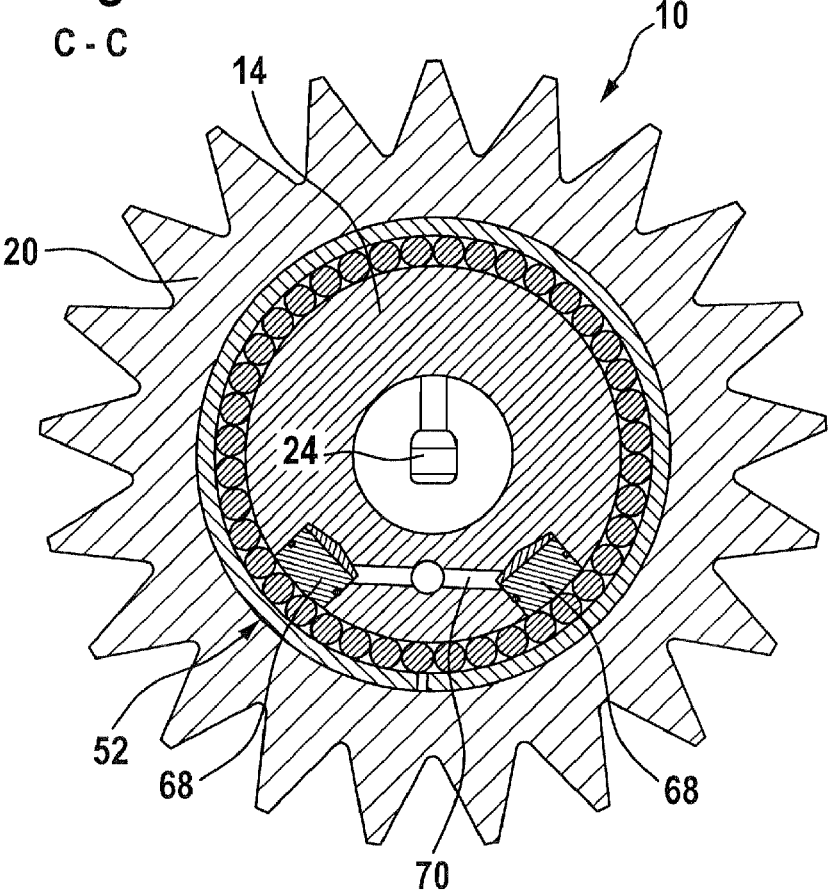
FIG. 10 illustrates a cross-sectional view of the hydraulic cylinder brake of the present invention.

FIG. 10 illustrates a brake 52 with a plurality of hydraulic pistons 68 with hydraulic fluid channels 70 interconnecting pistons 68. Pistons 68 are mounted in inner shaft 14 and bear against rollers 18.

Figure 11:
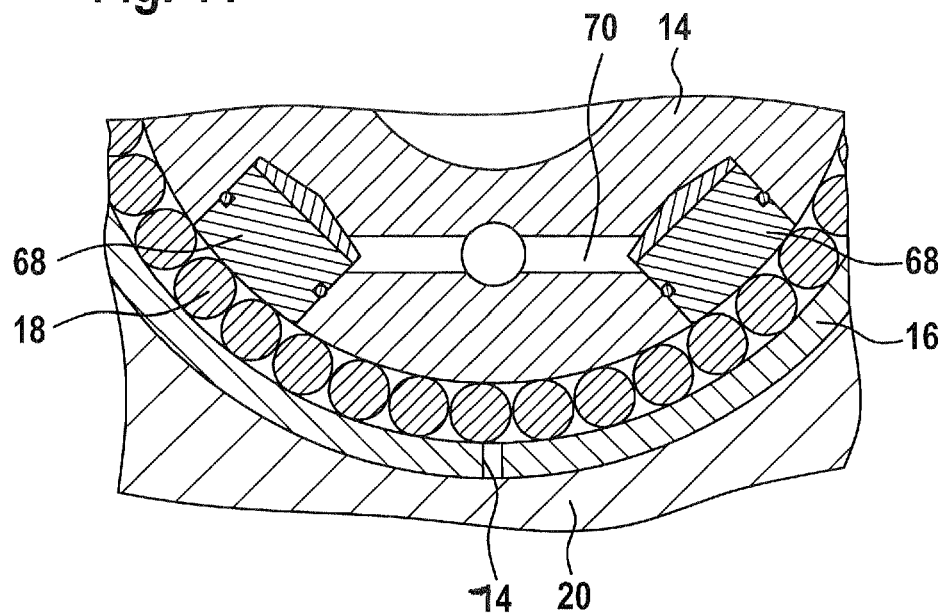
FIG. 11 is a detailed view of the hydraulic brake of the present invention.

FIG. 11 shows a close-up view of pistons 68 bearing against rollers 18. It will be noted that in FIGS. 10 and 11 pistons 68 are shown in an expanded mode such that they are applying a radial force against rollers 18 which in turn applies a radial force against slipper race 16. Because pistons 68 are positioned only at selected locations around the circumference of clutch 10, the pistons apply radial force only at the points where they make contact with rollers 18, thereby allowing slipper race 16 to partially engage outer shaft 20 and thereby provide for the third mode of operation of the present invention.

Figure 12:
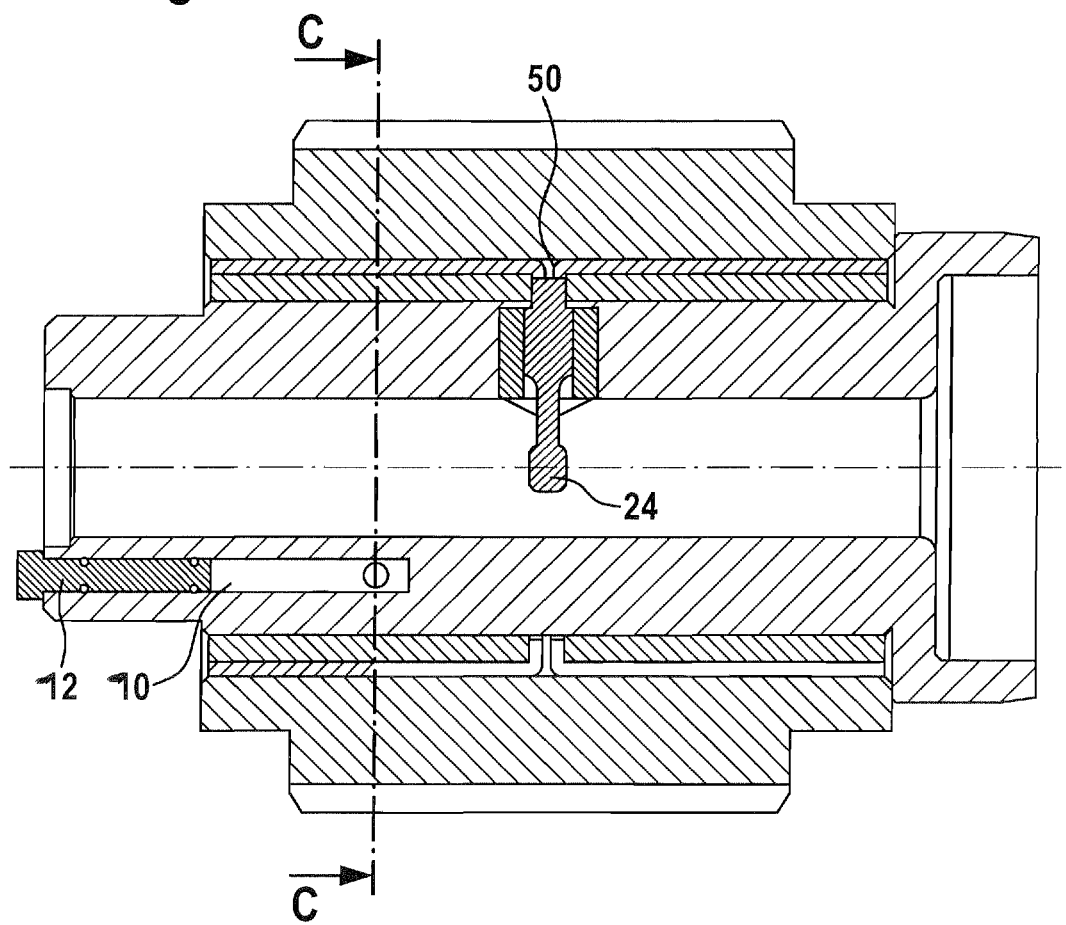
FIG. 12 illustrates an axial cross-section of the hydraulic brake of FIGS. 10 and 11.

FIG. 12 is an axial cross-section of clutch 10 as shown in FIG. 10. Actuator piston 72 is used to apply pressure to fluid chamber 70 and cause the movement of pistons 68. FIG. 10 illustrates a cross-section of FIG. 12 taken along lines C-C of FIG. 11.

It will be noted that actuator pin 24 and slot 50 do not coincide with the axial and radial groove 74 which allows slipper race 16 to expand and contract. Groove 74 is illustrated in FIG. 11.

REFERENCE CHARACTERS 10 clutch
12 fixed race
14 inner shaft
16 slipper race
18 rollers
20 outer shaft
22 clearance
24 actuator pin
26 arrow
28 actuator cam
29 spring
30 arrow
32 first radial surface
34 second radial surface
36 concave bearing surfaces
38 first radial surface
40 inner surface
42 second radial surface
44 concave bearing surfaces
46 pockets
48 arrows
50 slot
52 brake
54 conical hub
56 slated surface
58 arrows
60 arrows
62 arrows
64 ledge
66 arrow
68 pistons
70 fluid channels
72 actuator piston
74 groove

The invention claimed is:

1. A three-mode overrunning bi-directional clutch for mounting between a first and second coaxial shaft and for transferring power between the shafts, said clutch comprising:
   a cylindrical slipper race having a first radial surface for frictionally engaging the second shaft and a second radial surface having a plurality of concave bearing surfaces thereon;
   a cylindrical fixed race having a first radial surface fixed to said first shaft and a second radial surface having a plurality of concave bearing surfaces thereon, said slipper race coaxial with an radially opposing said fixed race, each of said concave bearing surfaces of said fixed race radially opposing one of said concave bearing surfaces of said slipper race so as to form pockets;
   cylindrical rollers positioned in each of said pockets;
   an actuator affixed to said fixed race and engageable with said slipper race, said actuator coupling and uncoupling said slipper race and said fixed race;
   an engagement member engageable with said slipper race for applying radial force against said slipper race to cause said first surface to engage said second shaft, and said clutch having three modes of operation;
   a first mode where said actuator couples said slipper race to said fixed race,
   a second mode where said actuator does not couple said slipper race from said fixed race, and
   a third mode where said actuator couples said slipper race to said fixed race and the engagement member applies radial force to said slipper race to cause said slipper race to engage said second shaft.

2. The clutch of claim 1, wherein the engagement member comprises
   a conical hub coaxially mounted on said first shaft and radially adjacent to said fixed and slipper race, said hub having a slanted engaging surface axially adjacent said slipper race, said slanted surface moveable into engagement with said slipper race to apply radial force against said slipper race and cause said slipper race to engage said second shaft.

3. The clutch of claim 1, wherein the engagement member comprises
   a plurality of hydraulic pistons fixed to said fixed race for applying radial force against select rollers to thereby applying radial force against said slipper race to cause said slipper race to engage said second shaft.

4. The clutch of claim 1, wherein the actuator is a moveable pin.

5. The clutch of claim 1, further comprising a cam mounted axially with said clutch and connected to said engagement member and said actuator so as to effect movement of both said brake and said actuator.

6. The clutch of claim 1 wherein the slipper race is the outer race and said fixed race is an inner race and said first shaft is an inner and said second shaft is an outer shaft.

* * * * *